(12) United States Patent
Tsunoda et al.

(10) Patent No.: US 6,501,023 B2
(45) Date of Patent: Dec. 31, 2002

(54) STEERING WIRE HARNESS, STEERING MODULE, AND WIRING SYSTEM OF STEERING WIRE HARNESS

(75) Inventors: Mitsunori Tsunoda, Shizuoka (JP); Masataka Nishijima, Shizuoka (JP); Masashi Tsukamoto, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/726,518

(22) Filed: Dec. 1, 2000

(65) Prior Publication Data

US 2001/0002623 A1 Jun. 7, 2001

(30) Foreign Application Priority Data

Dec. 2, 1999  (JP) ............................................ 11-343917

(51) Int. Cl.[7] ................................................ H02G 1/00
(52) U.S. Cl. ................. 174/72 A; 174/71 R; 174/72 R; 174/71 C
(58) Field of Search ............................. 174/72 A, 71 R, 174/72 R, 71 C (56) References Cited

U.S. PATENT DOCUMENTS

| | | | | |
|---|---|---|---|---|
| 4,122,357 A | * | 10/1978 | Sumida | 307/10 R |
| 4,943,241 A | * | 7/1990 | Watanabe et al. | 439/34 |
| 5,042,133 A | * | 8/1991 | Peterson et al. | 29/404 |
| 5,324,203 A | * | 6/1994 | Sano et al. | 439/34 |
| 5,668,415 A | * | 9/1997 | Nagami | 307/9.1 |
| 5,856,908 A | * | 1/1999 | Takiguchi et al. | 361/690 |
| 5,884,875 A | * | 3/1999 | Hanada et al. | 248/27.1 |
| 6,073,987 A | * | 6/2000 | Lindberg et al. | 296/70 |
| 6,168,122 B1 | * | 1/2001 | Lobsiger et al. | 248/68.1 |
| 6,249,425 B1 | * | 6/2001 | Sudo et al. | 174/72 A |
| 6,259,027 B1 | * | 7/2001 | Watanabe | 174/72 A |
| 6,291,770 B1 | * | 9/2001 | Casperson | 174/72 A |

FOREIGN PATENT DOCUMENTS

JP   4-274942   *   9/1992   ............ 174/72 A

* cited by examiner

*Primary Examiner*—Anthony Dinkins
*Assistant Examiner*—Jinhee J Lee
(74) *Attorney, Agent, or Firm*—Sughrue Mion, PLLC (57) ABSTRACT

It is so constructed that electric power for actuating auxiliary equipments provided on a steering body may be obtained from an instrument panel wire harness by way of a control unit connected to the auxiliary equipments and having control function for controlling a specified one of the auxiliary equipments according to a detection signal outputted from the specified auxiliary equipment concerning the specified auxiliary equipment, and the detection signal outputted from the auxiliary equipment or a control signal outputted from the auxiliary equipment may be respectively transmitted to the instrument panel wire harness by way of the control unit.

4 Claims, 6 Drawing Sheets

STEERING WIRE HARNESS, STEERING MODULE, AND WIRING SYSTEM OF STEERING WIRE HARNESS

BACKGROUND OF THE INVENTION

1. Technical Field

The present invention relates to a steering body which is provided at the rear of a steering wheel in a vehicle and provided with switches and associated auxiliary equipments surrounding a steering column of the vehicle, and more particularly to a steering wire harness, a steering module and a wiring system of the steering wire harness which can deal with any change in design of a steering section without modifying a control board, and in which wire arranging performance is easy.

2. Related Art

Figure 5:
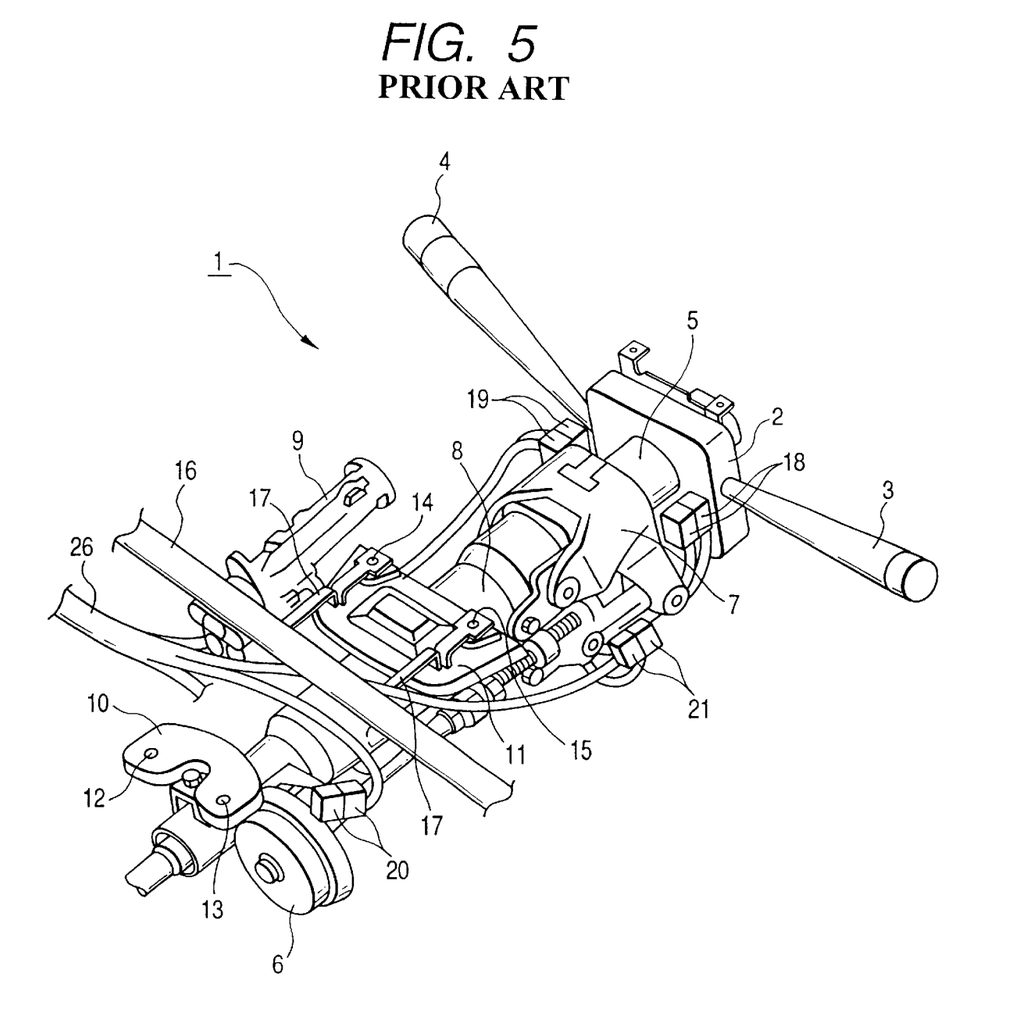
FIG. 5 is an extensive perspective view showing a related steering module.

A related steering module designates a steering body provided at the rear of a steering wheel in a vehicle and provided with switches and associated auxiliary equipments surrounding a steering column of the vehicle, and which has a structure as shown in FIG. 5. In particular, a steering module (steering body) 1 includes a combination switch box 2, to which a wiper lever 3 and a light control lever 4 are attached. In this combination switch box 2, are incorporated a wiper control switch and a wiper control circuit corresponding to the wiper lever 3, and a light control switch and a light control circuit corresponding to the light control lever 4 respectively.

By operating this wiper lever 3, controls of the wiper such as injection of window washer liquid, start of the wiper, setting of intermittent working time of the wiper, etc. are conducted. By operating the light control lever 4, controls of various lights such as switching on and off head lamps, stop lamps, parking lamps, etc. are conducted.

The combination switch box 2 is provided with a steering column main shaft 5. This steering column main shaft 5 is expanded and contracted by actions of a telescopic motor 6 thereby to adjust positions of a steering wheel (handle) in forward and backward directions. The steering module (the steering body) 1 further includes a tilt motor which is not shown in the drawing because it is located on a lower face side in FIG. 5. This tilt motor is adapted to bend the steering column main shaft 5 to adjust vertical positions of the steering wheel (the handle).

Numeral 7 represents a steering column upper tube. Numeral 8 represents a steering column tube.

Numeral 9 represents a key cylinder fixed to the steering column tube 8 and adapted to actuate an engine and accessory switches on and off by means of an engine key inserted and rotated in the key cylinder.

Numerals 10 and 11 represent mounting plates attached to the steering column tube 8. The mounting plate 10 is provided with a pair of bolt holes 12, 13 into which bolts are inserted, while the mounting plate 11 is provided with a pair of bolt holes 14, 15 into which bolts are inserted. The mounting plate 11 is further provided with a pair of steering energy absorbing plates 17 for absorbing backlash which occurs when the steering module (the steering body) 1 is fixed to a reinforce 16. This reinforce 16 is fixed between left and right walls of the vehicle for the purpose of reinforcing the vehicle body and formed in a C-shape in cross section. An instrument panel wire harness 26 is contained in the reinforce 16.

Numeral 18 represents a wiper connector. Numeral 19 represents a light control connector. Numeral 20 represents a telescopic connector. Numeral 21 represents a tilt connector.

Figure 6:
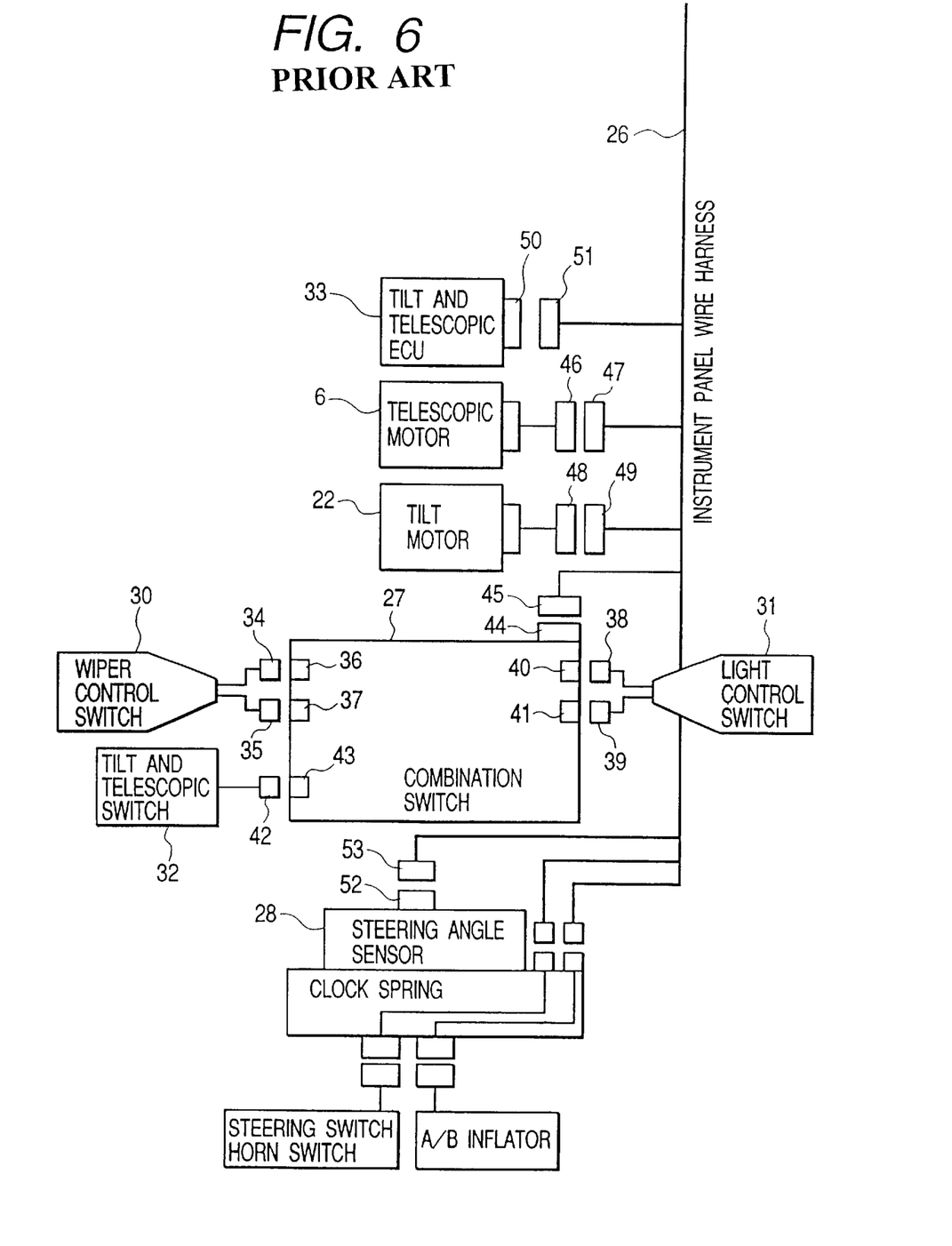
FIG. 6 is a diagram showing a wiring system in the related steering module as shown in FIG. 5.

In the steering module (the steering body) 1 which is shown in FIG. 5, wiring arrangement is as shown in FIG. 6. In particular, a wiper control switch 30 is connected to a combination switch 27 with its connectors 34, 35 on a wiper side engaged with connectors 36, 37 on a combination switch side. Further, a light control switch 31 is connected to the combination switch 27 with its connectors 38, 39 on a light side engaged with connectors 40, 41 on the combination switch side. A tilt and telescopic switch 32 for switching the telescopic motor 6 and the tilt motor 22 is connected to the combination switch 27 with its connector 42 on a tilt and telescopic side engaged with a connector 43 on the combination switch side. This combination switch 27 is connected to a connector 45 on an instrument panel side which is fitted to an end of the instrumental panel wire harness 26 through a connector 44 which is provided on the combination switch 27 for connection with the exterior.

The telescopic motor 6 is connected to an instrument panel side connector 47 through a connector 46. The tilt motor 22 is connected to an instrument panel side connector 49 through a connector 48. Actuating power is supplied from the instrument panel wire harness 26.

A tilt and telescopic control circuit 33 for controlling the telescopic motor 6 and the tilt motor 22 is connected to an instrument panel side connector 51 by way of a connector 50. The telescopic motor 6 and the tilt motor 22 are controlled by the tilt and telescopic control circuit 33 through the instrument panel wire harness 26. This tilt and telescopic control circuit 33 is fixed to the body.

In the related steering module constructed in this manner, the wiper control switch 30 and the wiper control circuit corresponding to the wiper lever 3, and the light control switch 31 and the light control circuit corresponding to the light control lever 4 are respectively contained in the combination switch box 2. Connectors 18, 19 for connection with the exterior are attached to this combination switch box 2. The instrument panel side connector 45 of the instrument panel wire harness 26 is connected to the connector 44 for the connection with the exterior of the combination switch 27 which is connected to the connectors 18, 19, whereby the wiper control switch 30 and the light control switch 31 are connected to the instrument panel wire harness 26.

A driver control circuit of a steering angle sensor 28 is provided inside the steering angle sensor 28. This steering angle sensor 28 is connected directly to the instrument panel wire harness 26, by connecting a connector 52 for connection with the exterior to an instrument panel side connector 53 of the instrument panel wire harness 26.

The tilt and telescopic control circuit 33 for controlling the telescopic motor 6 and the tilt motor 22 is connected to an instrument panel side connector 51 through a connector 50, and fixed to the body.

Such being the wiring arrangement, on each occasion where an outer design of the combination switch box 2 is changed, circuit boards for the wiper control circuit and the light control circuit must be redesigned, and it has been a problem that versatility of the circuit boards is low.

Moreover, since the various control circuits and the instrument panel wire harness 26 are directly connected, it has been necessary to prepare a number of connectors which are extended to various auxiliary equipments. Therefore, it has been another problem that wiring work becomes complicated and takes a lot of troubles, and workability of connecting the connectors on occasion of mounting the steering module will be low.

SUMMARY OF THE INVENTION

An object of the invention is to provide a wiring arrangement in which any design change of the steering section can be dealt with without modifying the designs of the circuit boards, maintenance can be easily performed in case where an abnormal accident has occurred in the control circuits, and assembling of the steering section and the instrument panel wire harness can be completed by fitting the steering module to the reinforce, thereby enhancing the workability of connecting the connectors.

In order to attain the above described object, a steering wire harness includes a first steering wire harness which is connected at its one end to auxiliary equipments provided on a steering body and provided with a first connector portion at the other end, and a second steering wire harness which includes a second connector portion adapted to be engaged with the first connector portion at its one end and a third connector portion adapted to be connected to an instrument panel wire at the other end.

By constructing the steering wire harness in this manner, according to the invention, assembling of the steering section and the instrument panel wire harness can be completed by simply fitting the steering module to the reinforce, and the workability of connecting the connectors can be enhanced.

In order to attain the above described object, a steering wire harness is connected to a control unit at its one end, and includes at the other end an instrument panel side connector portion which is connected to an instrument panel wire, and at least one auxiliary equipment side connector portion which supplies a control signal from the control unit to an auxiliary equipment provided on a steering body.

By constructing the steering wire harness in this manner, according to the invention, any design change of the steering section can be dealt with without modifying the designs of the circuit boards, maintenance can be easily performed in case where an abnormal accident has occurred in the control circuits, and assembling of the steering section and the instrument panel wire harness can be completed by fitting the steering module to the reinforce, thereby enhancing the workability of connecting the connectors.

In order to attain the above described object, a steering module is provided at the rear of a steering wheel in a vehicle and comprises a steering wire harness connected to a control unit at its one end, and including at the other end an instrument panel side connector portion which is connected to an instrument panel wire, and at least one auxiliary equipment side connector portion which supplies a control signal from the control unit to an auxiliary equipment provided on a steering body, the steering wire harness being fixed to the steering body.

By constructing the steering module in this manner, according to the invention, any design change of the steering section can be dealt with without modifying the designs of the circuit boards, maintenance can be easily performed in case where an abnormal accident has occurred in the control circuits, and assembling of the steering section and the instrument panel wire harness can be completed by fitting the steering module to the reinforce thereby enhancing the workability of connecting the connectors.

In order to attain the above described object, in the steering module, the instrument panel side connector portion is fixed to the steering body and face to a mounting face of a vehicle body side.

By constructing the steering module in this manner, according to the invention, assembling of the steering section and the instrument panel wire harness can be completed by simply fitting the steering module to the reinforce, and the workability of connecting the connectors can be enhanced.

In order to attain the above described object, a wiring system of a steering wire harness is constructed in such a manner that electric power for actuating auxiliary equipments provided on a steering body is obtained from an instrument panel wire harness by way of a control unit connected to the auxiliary equipments and having control function for controlling a specified one of the auxiliary equipments according to a detection signal outputted from the specified auxiliary equipment concerning the specified auxiliary equipment, the detection signal outputted from the auxiliary equipment or a control signal outputted from the auxiliary equipment being respectively transmitted to the instrument panel wire harness by way of the control unit.

By constructing the wiring system of the steering wire harness in this manner, according to the invention, any design change of the steering section can be dealt with without modifying the designs of the circuit boards, maintenance can be easily performed in case where an abnormal accident has occurred in the control circuits, and assembling of the steering section and the instrument panel wire harness can be completed by fitting the steering module to the reinforce thereby enhancing the workability of connecting the connectors.

DETAILED DESCRIPTION OF PREFERRED EMBODIMENT

Now, mode for carrying out the steering wire harness, the steering module, and the wiring system of the steering wire harness according to the invention will be described hereunder.

Figure 1:
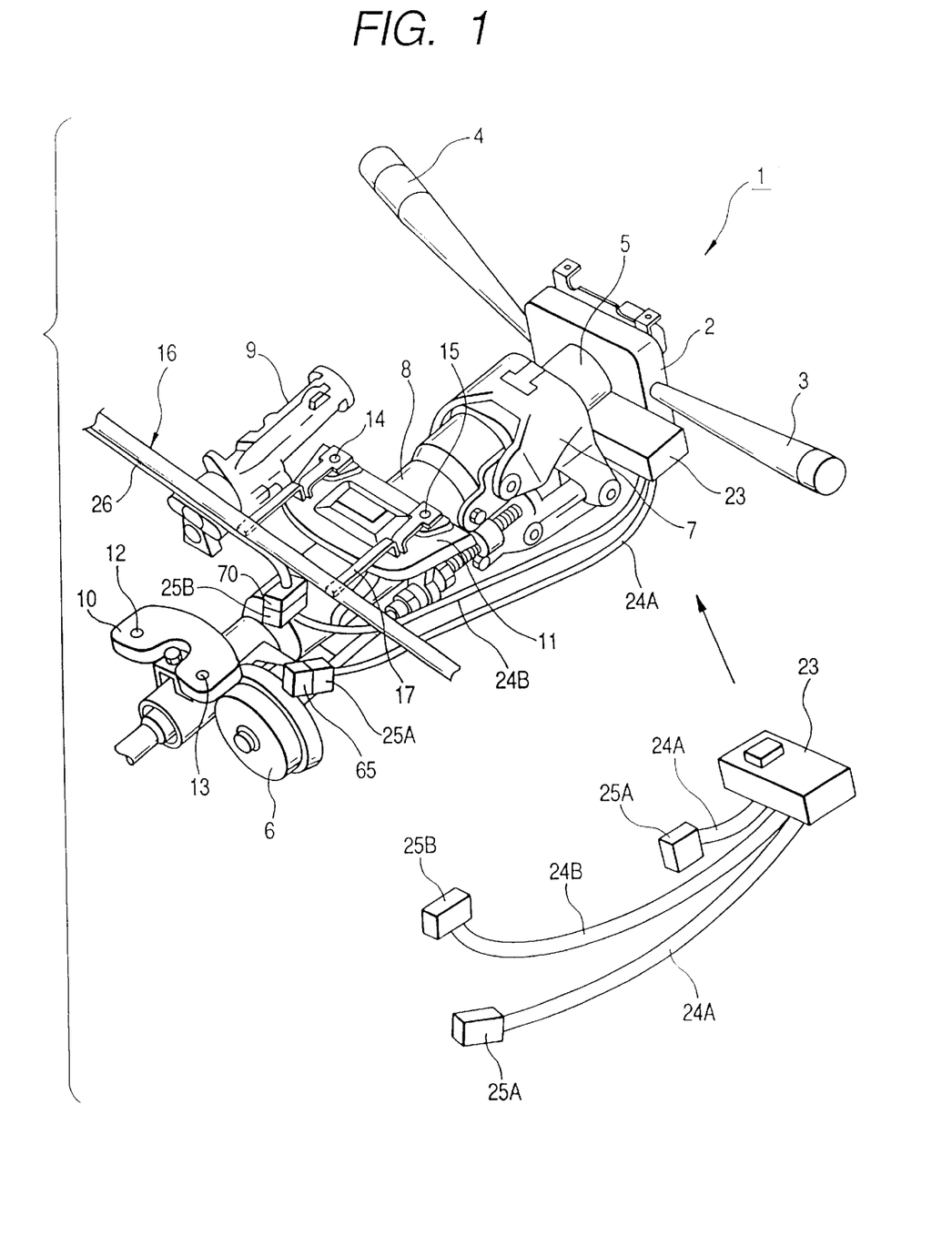
FIG. 1 is an extensive perspective view showing an embodiment of a steering module according to the invention.
Figure 2:
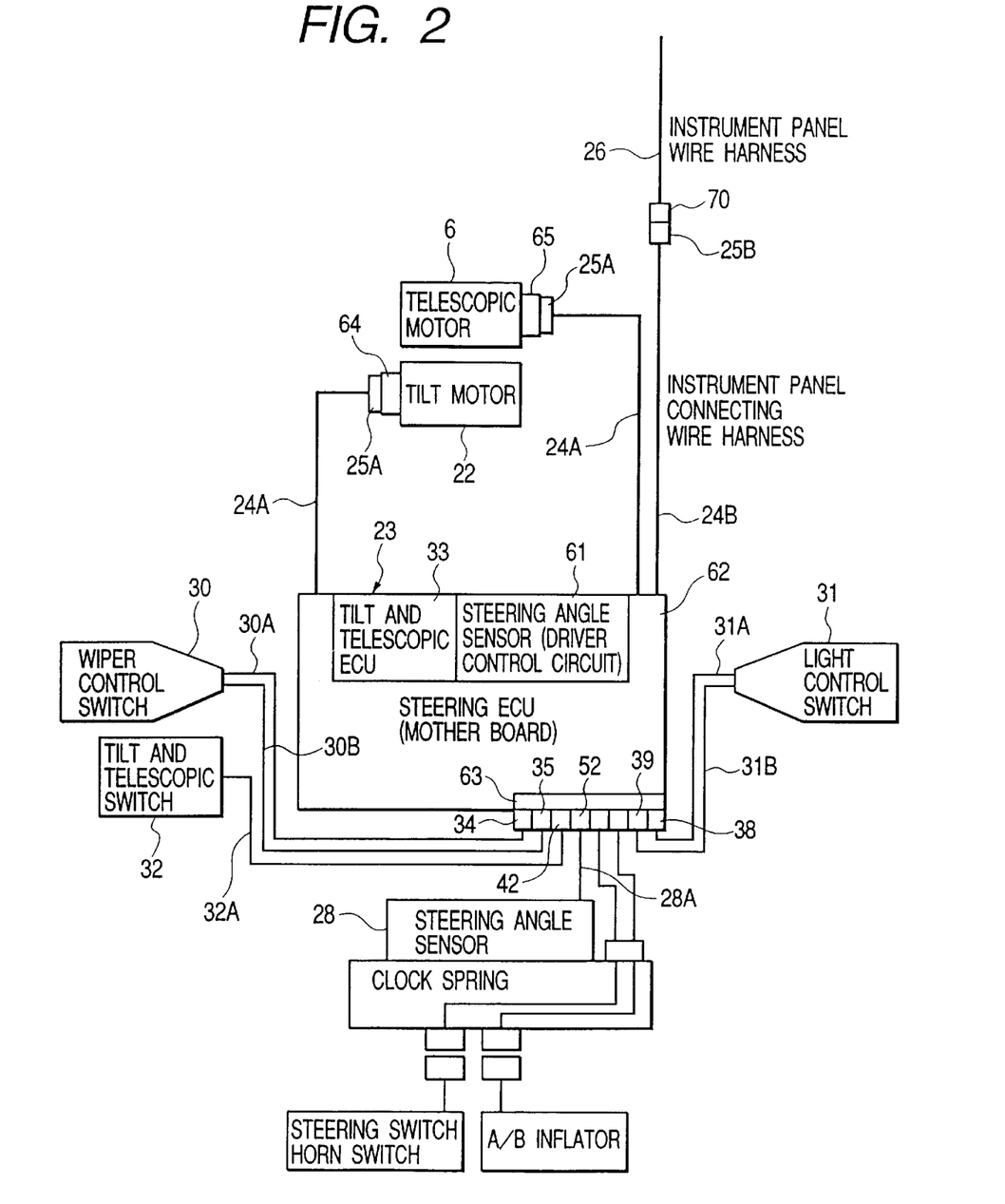
FIG. 2 is a diagram showing a steering wire harness in the steering module as shown in FIG. 1 and a wiring system of the steering wiring harness.
Figure 3:
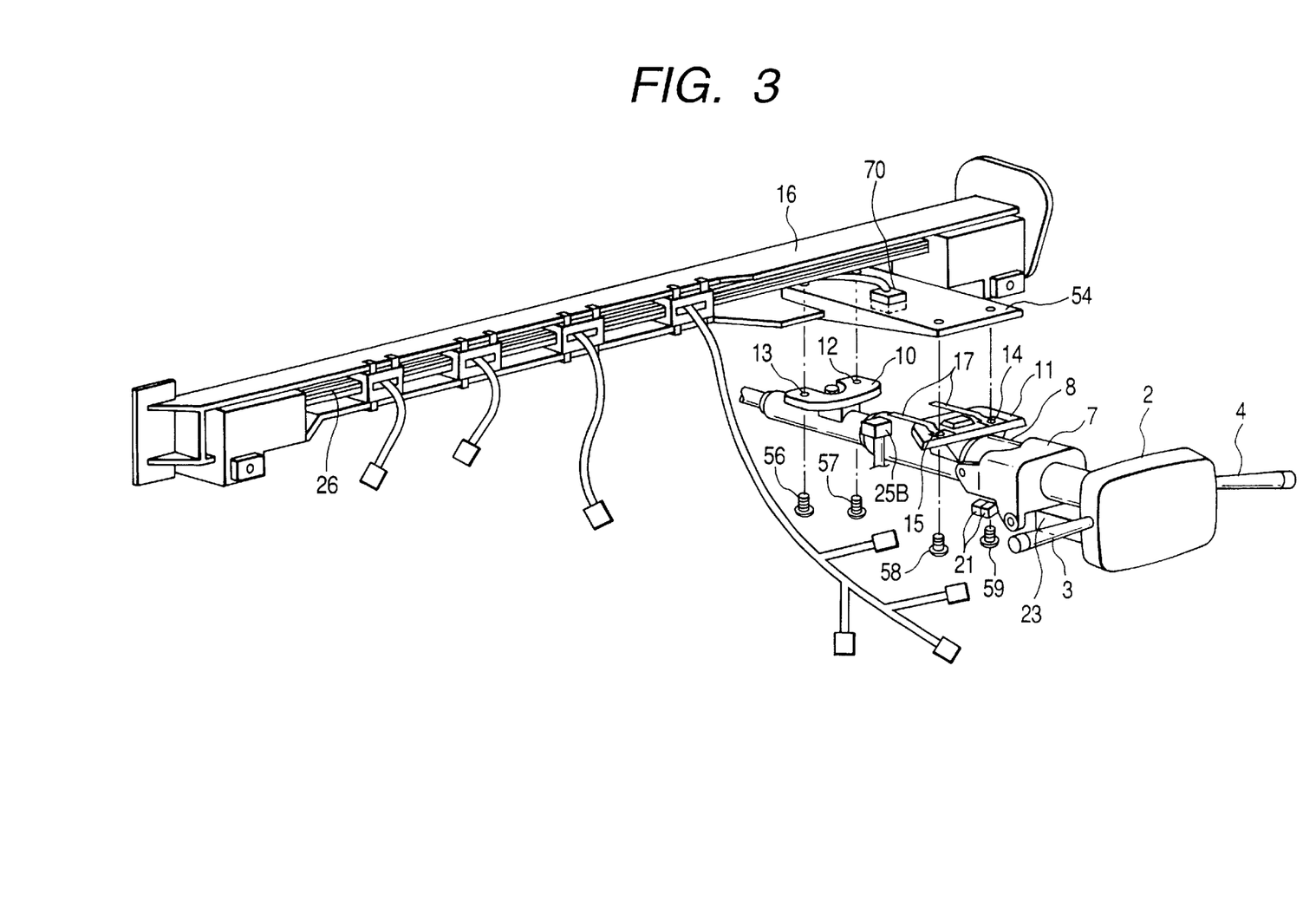
FIG. 3 is an exploded perspective view for explaining a manner of mounting the steering module as shown in FIG. 1 to a vehicle body.

In FIGS. 1 to 3, there is shown an embodiment of the steering wire harness, the steering module, and the wiring system of the steering wire harness according to the invention.

As shown in FIG. 1, a steering module (steering body) 1 includes a combination switch box 2. A wiper lever 3 and a light control lever 4 are attached to the combination switch box 2. A wiper control switch corresponding to the wiper lever 3, and a light control switch corresponding to the light control lever 4 are incorporated in this combination switch box 2, respectively.

The combination switch box 2 is provided with a steering column main shaft 5. This steering column main shaft 5 is expanded and contracted by actions of a telescopic motor 6 to adjust positions of the steering wheel (the handle) in forward and backward directions. The steering module (the steering body) 1 includes a tilt motor which is not shown in the drawing because it is located on a lower face side in FIG. 1. This tilt motor is adapted to bend the steering column main shaft 5 to adjust vertical positions of the steering wheel (the handle)

A control unit 23 is provided adjacent to the combination switch box 2. As shown in FIG. 2, the wiper control circuit corresponding to the wiper lever 3 and the light control circuit corresponding to the light control lever 4 which have been conventionally incorporated in the combination switch box 2 are contained in a steering ECU (mother board) 62. This wiper control circuit is adapted to conduct controls of the wiper such as injection of the window washer liquid, start of the wiper, setting of the intermittent working time of the wiper, etc. by operating the wiper lever 3. The light control circuit is adapted to conduct controls of various lights such as switching on and off the head lamps, the stop lamps, the parking lamps, etc. by operating the light control lever 4.

The control unit 23 contains a tilt and telescopic control circuit (tilt and telescopic ECU) 33 for controlling actions of the telescopic motor 6 and the tilt motor according to signals from a tilt and telescopic control switch 32 as shown in FIG. 2, and a driver control circuit 61 of a steering angle sensor 28. When the tilt and telescopic control switch 32 is operated to input a signal into the telescopic motor 6, the tilt and telescopic control circuit 33 actuates the telescopic motor 6 to expand and contract the steering column main shaft 5 thereby controlling the steering wheel (the handle) to adjust it in forward and backward positions. When the tilt and telescopic control switch 32 is operated to input a signal into the tilt motor 22, the tilt and telescopic control circuit 33 actuates the tilt motor 22 to bend the steering column main shaft 5 thereby controlling the steering wheel (the handle) to adjust it in upward and downward positions.

Wire harnesses 24A for a plurality of auxiliary equipments and an instrument panel connecting wire harness 24B for connection with an instrument panel wire harness 26 are connected to the control unit 23 in correspondence to the incorporated control circuits. Connectors 25A for connection with auxiliary equipments and a connector 25B for connection with the instrument panel are respectively connected to distal ends of the wire harnesses 24A for a plurality of the auxiliary equipments and the instrument panel connecting wire harness 24B. The auxiliary equipments connecting connectors 25A are adapted to be engaged with connectors provided in the auxiliary equipments which correspond to the incorporated control circuits. The instrument panel connecting connector 25B is adapted to be engaged with an instrument panel side connector 70 which is attached to an end of the instrument panel wire harness 26.

Numeral 7 represents a steering column upper tube, and numeral 8 represents a steering column tube.

Numeral 9 represents a key cylinder fixed to the steering column tube 8 and adapted to actuate an engine and accessory switches on and off by means of an engine key inserted and rotated in the key cylinder.

Numerals 10 and 11 represent mounting plates attached to the steering column tube 8. The mounting plate 10 is provided with a pair of bolt holes 12, 13 into which bolts are inserted. The mounting plate 11 is provided with a pair of bolt holes 14, 15 into which bolts are inserted. The mounting plate 11 is further provided with a pair of steering energy absorbing plates 17 for absorbing backlash which occurs when the steering module (steering body) 1 is fixed to a reinforce 16. This reinforce 16 is fixed between left and right walls of the vehicle for the purpose of reinforcing the body and formed in a C-shape in cross section. The instrument panel wire harness 26 is contained in the reinforce 16.

The instrument panel connecting connector 25B is fixed to the steering column tube 8 by appropriate means. In order to fix this instrument panel connecting connector 25B to the steering column tube 8, a connecting side of the instrument panel connecting connector 25B is directed toward the reinforce 16 so that a distal end of the instrument panel connecting connector 25B projects toward the reinforce 16 beyond the mounting faces of the mounting plates 10, 11. This is so constructed in order that the instrument panel connecting connector 25B is engaged with the instrument panel side connector 70 attached to the end of the instrument panel wire harness 26, at the same time when the steering module 1 is fixed to the reinforce 16.

Therefore, it is not an essential requirement that the distal end of the instrument panel connecting connector 25B projects toward the reinforce 16 beyond the mounting faces of the mounting plates 10, 11, when the instrument panel connecting connector 25B is fixed to the steering column tube 8. In case where the distal end of the instrument panel connecting connector 25B is provided at a lower portion than the mounting faces of the mounting plates 10, 11 when the instrument panel connecting connector 25B is fixed to the steering column tube 8, the mounting plates 10, 11 are abutted against the reinforce 16 so that a distal end of the connector 70 may project toward the steering module 1 beyond the mounting faces of the mounting plates 10, 11.

Numeral 65 represents a connector for the telescopic motor. Numeral 64 is a connector for the tilt motor.

In the steering module (the steering body) 5 as shown in FIG. 1, wiring arrangement is as shown in FIG. 2. In particular, to a connector 603 of the control unit 23, are respectively connected the wiper side connectors 34, 35 connected to the wiper control switch 30 through wire harnesses 30A, 30B, the light side connectors 38, 39 connected to the light control switch 31 through wire harnesses 31A, 31B, the tilt and telescopic side connector 42 connected to the tilt and telescopic switch 32 for switching the telescopic motor 6 and the tilt motor 22 through a wire harness 32A, and the connector 52 for connection with the exterior connected to the steering angle sensor 28 through a wire harness 28A.

The telescopic motor 6 through the connector 65 connected to the auxiliary equipment wire harness 24A, and the tilt motor 22 through the connector 64 connected to the auxiliary equipment wire harness 24A are respectively connected to the control unit 23.

The instrument panel connecting wire harness 24B for connection with the exterior is connected to the control unit 23. The instrument panel connecting connector 25B is connected to the distal end of this instrument panel connecting wire harness 24B. This instrument panel connecting connector 25B is engaged with the instrument panel side connector 70 which is attached to the end of the instrument panel wire harness 26 contained in the reinforce 16 and drawn out therefrom.

As described, the steering module is composed of the control unit 23, the telescopic motor 6, the tilt motor 22, the wiper control switch 30, the light control switch 31, the tilt and telescopic switch 32, the steering angle sensor 28, a clock spring, a steering switch, a horn switch, and an A/B inflator.

The steering wire harness includes the wire harnesses 30A, 30B connected to the wiper control switch 30, the wire harnesses 31A, 31B connected to the light control switch 31, the wire harness 32A connected to the tilt and telescopic switch 32, the wire harness 28A connected to the steering angle sensor 28, the auxiliary equipment wire harness 24A which connects the telescopic motor 6 with the control unit 23, the auxiliary equipment wire harness 24A which connects the tilt motor 22 with the control unit 23, the instrument panel connecting wire harness 24B which connects the control unit 23 with the instrument panel wire harness 26, all of which are bundled.

The steering module (the steering body) 1 constructed in this manner is fixed to the reinforce 16. Mounting of the steering module (the steering body) 1 on the reinforce 16 is conducted as shown in FIG. 3. In particular, the mounting plates 10, 11 of the steering module 1 are disposed on a lower face of a fixed plate 54 provided on the reinforce 16. Bolts 56, 57 are inserted into the bolt holes 12, 13 formed in the mounting plate 10, and screwed into holes formed in the fixed plate 54 which is provided on the reinforce 16. Bolts 58, 59 are inserted into the bolt holes 14, 15 formed in the mounting plate 11, and screwed into holes formed in the fixed plate 54 which is provided on the reinforce 16 whereby the steering module 1 is fixed to the reinforce 16. The instrument panel side connector 70 is fixed to the fixed plate 54 provided on the reinforce 16 with its open mouth directed to the steering module 1. The instrument panel side connector 70 is connected to the tip end of the instrument panel wire harness 26 which is contained in the reinforce 16 and drawn out therefrom.

At the same time when the steering module 1 is fixed to the reinforce 16 by the bolts 56, 57, 58, 59, the instrument panel connecting connector 25B is brought into engagement with the instrument panel side connector 70 which is attached to the fixed plate 54 of the reinforce 16.

Since the control unit 23 in which the control circuits are contained is mounted adjacent to the combination switch box 2 according to the embodiment of the invention, even though the outer design of the combination switch box 2 is changed, the design of the control circuits need not be modified unless the control circuits have changed in their controlling functions, and the versatility can be enhanced.

According to the embodiment of the invention, the control unit 23 containing the tilt and telescopic ECU and the driver control circuit for the steering angle sensor is mounted near the combination switch box 2. Accordingly, in case where an abnormal accident has occurred in the control systems, the control unit 23 can be easily taken out by detaching an upper cover or a lower cover of a dividable cover which covers the steering module, without disassembling the steering module as in the conventional case. Thus, the control systems of the steering section can be easily repaired.

According to the embodiment of the invention, since the instrument panel side connector 70 is fixed such that the instrument panel side connector 70 faces a mounting face of the vehicle body side, at the same time when the steering module is fixed to the reinforce, the instrument panel connecting connector is brought into engagement with the instrument panel side connector. Therefore, the wiring work will be performed without any trouble, and the workability of connecting the connectors on occasion of mounting the steering module can be enhanced.

Figure 4:
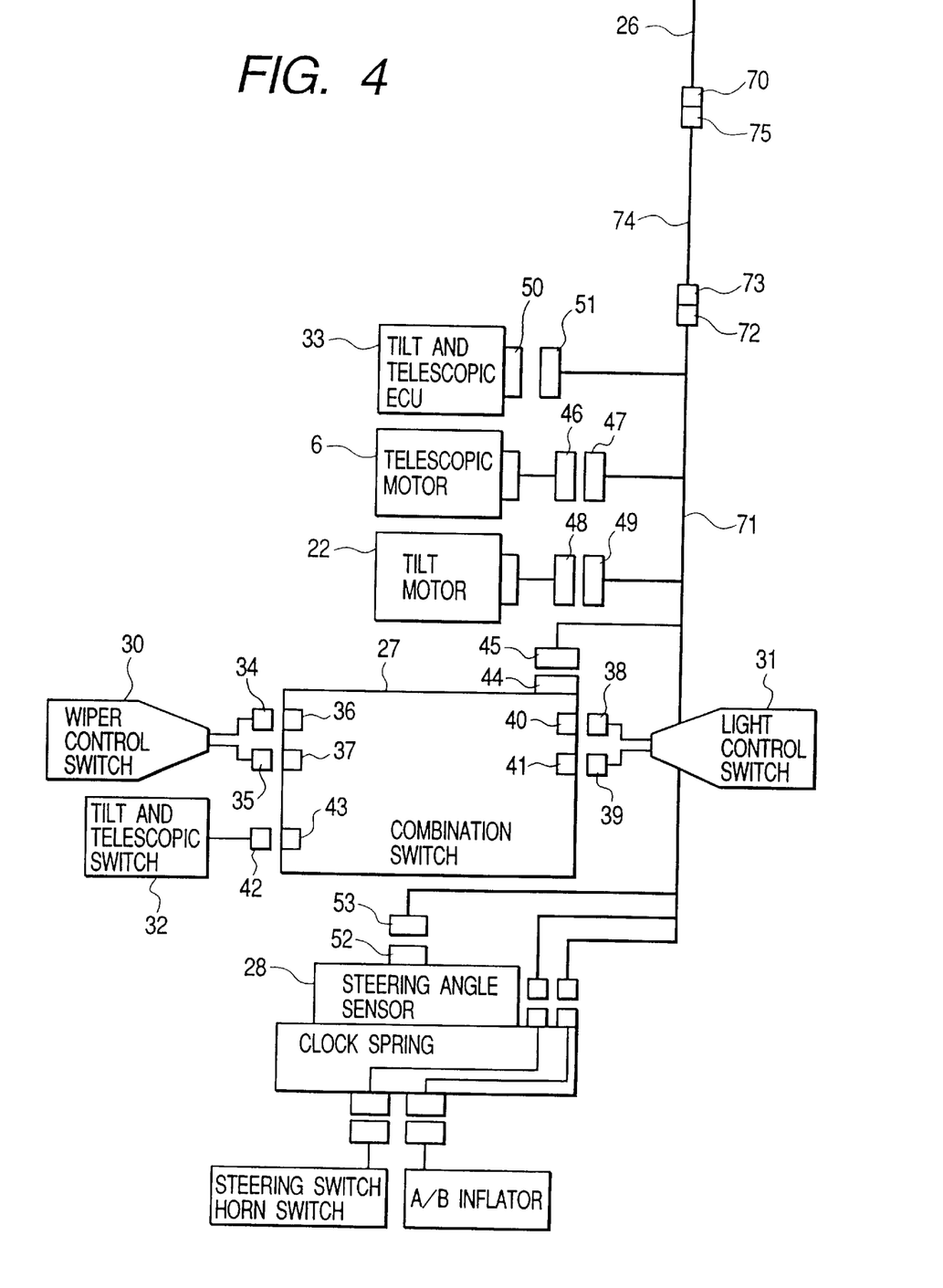
FIG. 4 is a diagram showing another embodiment of the wiring system of the steering wire harness according to the invention.

FIG. 4 shows another embodiment of the wiring systems of the steering wire harness according to the invention.

In the drawing, a bundling wire harness 71 is connected to the instrument panel side connector 45 which is adapted to be engaged with the connector 44 for connection with the exterior provided in the combination switch 27. A bundling connector 72 is connected to an end of this bundling wire harness 71. The instrument panel side connector 47 which is adapted to be engaged with the connector 46 connected to the telescopic motor 6 is connected to this bundling connector 72 through the bundling wire harness 71. The instrument panel side connector 49 which is adapted to be engaged with the connector 48 connected to the tilt motor 22 is connected to this bundling connector 72 through the bundling wire harness 71. The instrument panel side connector 51 which is adapted to be engaged with the connector 50 connected to the tilt and telescopic control circuit 33 for controlling the telescopic motor 6 and the tilt motor 22 is connected to the bundling connector 72 through the bundling wire harness 71. The instrument panel side connector 53 which is adapted to be engaged with the connector 52 for connection with the exterior connected to the steering angle sensor 28 is connected to this bundling connector 72 through the bundling wire harness 71.

This bundling connector 72 is mounted on such a position that either of the connectors of the steering module (the steering body) 1 can be easily engaged and detached. The position may be anywhere in the steering module (the steering body) 1 provided that the connector is easily detachable.

A relay wire harness 74 is connected to the bundling connector 72. A steering side connector 73 which is adapted to be engaged with the bundling connector 72 is provided at one end of the relay wire harness 74. An instrument panel side connector 75 which is adapted to be engaged with the instrument panel side connector 70 connected to the tip end of the drawn out instrument panel wire harness 26 is provided at the other end of the relay wire harness 74. This relay wire harness 74 interconnects the bundling connector 72 fitted to the bundling wire harness 71 and the instrument panel side connector 70 connected to the tip end of the drawn out instrument panel wire harness 26.

As described, according to the instant embodiment, the wire harnesses connected to the respective auxiliary equipments are bundled at one position and connected to the single bundling connector 72. The bundling connector 72 is connected to the instrument panel wire harness 26 through the relay wire harness 74. Therefore, the connections between the auxiliary equipments and the instrument panel wire harness 26 can be conducted only by engaging the steering side connector 73 of the relay wire harness 74 with the bundling connector 72, then, connecting the instrument panel side connector 70 connected to the tip end of the drawn out instrument panel wire harness 26 with the instrument panel side connector 75 of the relay wire harness 74. Thus, the wiring arrangement will not take any trouble, and the workability of connecting the connectors on occasion or mounting the steering module can be enhanced.

Because the invention is so constructed as described above, the invention can achieve such effects as described below.

According to the present invention, assembling of the steering section and the instrument panel wire harness can be completed by simply fitting the steering module to the reinforce, and the workability of connecting the connectors can be enhanced.

According to the present invention, assembling of the steering section and the instrument panel wire harness can be completed by simply fitting the steering module to the reinforce, and the workability of connecting the connectors can be enhanced.

According to the present invention, any design change of the steering section can be dealt with, without modifying the designs of the circuit boards, maintenance can be easily performed in case where an abnormal accident has occurred in the control circuits, and assembling of the steering section and the instrument panel wire harness can be completed by fitting the steering module to the reinforce, thereby enhancing the workability of connecting the connectors.

What is claimed is:

1. A steering wire harness comprising:
   a first steering wire harness, one end of said first steering wire harness connected to auxiliary equipment provided on a steering body, the other end of said steering wire harness connected to a first connector portion; and
   a second steering wire harness, one end of said second steering wire harness connected to a second connector portion adapted to be engaged with said first connector portion, the other end of said second steering wire harness connected to a third connector portion adapted to be connected to an instrument panel wire.

2. A steering wire comprising:
   a first steering wire harness, one end of said first steering wire harness connected to a control unit,
   an instrument panel side connector portion connected to the other side of said first steering wire harness and adapted to be connected to an instrument panel wire; and
   at least one auxiliary equipment side connector portion, provided at a second steering wire harness, for supplying control signal from said control unit to an auxiliary equipment provided on a steering body.

3. A steering module provided at a rear of a steering wheel in a vehicle, said steering module comprising:
   a steering body;
   a first steering wire harness fixed to said steering body, one end of said first steering wire harness connected to a control unit,
   an instrument panel side connector portion connected to the other end of said first steering wire harness and adapted to be connected to an instrument wire harness; and
   at least one auxiliary equipment side connector portion, provided at a second steering wire harness, for supplying control signal from said control unit to an auxiliary equipment provided on said steering body.

4. A steering module according to claim 3, wherein said instrument panel side connector portion is fixed to said steering body and faced toward a mounting face of a vehicle body side.

* * * * *